(12) United States Patent
Jooste et al.

(10) Patent No.: US 8,625,800 B2
(45) Date of Patent: *Jan. 7, 2014

(54) PORTABLE SECURE ELEMENT

(71) Applicant: Google Inc., Mountain View, CA (US)

(72) Inventors: Sarel Kobus Jooste, Novato, CA (US); John Joseph, Colma, CA (US); Shane Alexander Farmer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,660

(22) Filed: Feb. 25, 2013

(65) Prior Publication Data

US 2013/0223623 A1 Aug. 29, 2013

Related U.S. Application Data

(63) Continuation of application No. 13/523,637, filed on Jun. 14, 2012, now Pat. No. 8,385,553.

(60) Provisional application No. 61/604,503, filed on Feb. 28, 2012.

(51) Int. Cl.
*H04L 9/00* (2006.01)
*H04L 9/32* (2006.01)

(52) U.S. Cl.
USPC ............................ 380/277; 380/281; 713/193

(58) Field of Classification Search
USPC .............. 726/1–7, 9, 20–21, 27–30; 380/270, 380/277, 281, 284, 286; 713/155, 164, 713/168–170, 182, 185, 189, 193–194
See application file for complete search history.

(56) References Cited

U.S. PATENT DOCUMENTS

| | | | |
|---|---|---|---|
| 4,851,653 | A | 7/1989 | Limisaque et al. |
| 5,221,838 | A | 6/1993 | Gutman et al. |

(Continued)

FOREIGN PATENT DOCUMENTS

| | | | |
|---|---|---|---|
| DE | 19925389 A1 | 12/2000 | |
| EP | 1004992 A2 | 5/2000 | |

(Continued)

OTHER PUBLICATIONS

U.S. Appl. No. 60/338,419, filed Dec. 4, 2001, Merckling et al.

(Continued)

*Primary Examiner* — Hosuk Song
(74) *Attorney, Agent, or Firm* — Johnson, Marcou & Isaacs, LLC (57) ABSTRACT

Transferring control of a secure element between TSMs comprises a zone master key established between the TSMs that facilitates encryption of a temporary key. The TSMs create the zone master key prior to initiation of transfer of control. Once transfer of control is initiated, the first TSM establishes a communication channel and deletes its key from the secure element. The first TSM creates a temporary key that is encrypted with the zone master key established between the first TSM and the second TSM. The encrypted temporary key is communicated to the second TSM with a device identifier. The second TSM decrypts the temporary key using the zone master key and identifies the user device using the device identifier. The new TSM establishes a communication channel and deletes the temporary key from the secure element. The new TSM then inputs and saves its key into the secure element.

30 Claims, 8 Drawing Sheets

(56) References Cited

U.S. PATENT DOCUMENTS

| | | | |
|---|---|---|---|
| 5,321,242 | A | 6/1994 | Heath, Jr. |
| 5,692,049 | A * | 11/1997 | Johnson et al. ............... 713/189 |
| 5,787,173 | A | 7/1998 | Seheidt et al. |
| 5,872,849 | A | 2/1999 | Sudia |
| 5,991,399 | A | 11/1999 | Graunke et al. |
| 6,005,942 | A | 12/1999 | Chan et al. |
| 6,041,123 | A | 3/2000 | Colvin, Sr. |
| 6,092,201 | A | 7/2000 | Turnbul et al. |
| 6,101,477 | A | 8/2000 | Hohle et al. |
| 6,141,752 | A | 10/2000 | Dancs et al. |
| 6,151,657 | A | 11/2000 | Sun et al. |
| 6,230,267 | B1 | 5/2001 | Richards et al. |
| 6,233,683 | B1 | 5/2001 | Chan et al. |
| 6,402,028 | B1 | 6/2002 | Graham, Jr. et al. |
| 6,434,238 | B1 | 8/2002 | Chaum et al. |
| 6,484,174 | B1 | 11/2002 | Wall et al. |
| 6,601,761 | B1 | 8/2003 | Katis |
| 6,609,113 | B1 | 8/2003 | O'Leary et al. |
| 6,633,984 | B2 | 10/2003 | Susser et al. |
| 6,647,260 | B2 | 11/2003 | Dusse et al. |
| 6,732,278 | B2 | 5/2004 | Baird et al. |
| 6,792,536 | B1 | 9/2004 | Teppler |
| 6,816,968 | B1 * | 11/2004 | Walmsley ..................... 713/168 |
| 6,823,520 | B1 | 11/2004 | Susser et al. |
| 6,907,608 | B1 | 6/2005 | Susser et al. |
| 6,922,835 | B1 | 7/2005 | Susser et al. |
| 6,963,270 | B1 | 11/2005 | Gallagher, III et al. |
| 7,093,122 | B1 | 8/2006 | Susser et al. |
| 7,140,549 | B2 | 11/2006 | De Jong |
| 7,152,782 | B2 | 12/2006 | Shenker et al. |
| 7,159,180 | B2 | 1/2007 | Ward |
| 7,165,727 | B2 | 1/2007 | de Jong |
| 7,191,288 | B2 | 3/2007 | de Jong |
| 7,206,769 | B2 | 4/2007 | Laurent et al. |
| 7,232,073 | B1 | 6/2007 | De Jong |
| 7,243,853 | B1 | 7/2007 | Levy et al. |
| 7,275,685 | B2 | 10/2007 | Gray et al. |
| 7,346,170 | B2 | 3/2008 | Asano et al. |
| 7,349,885 | B2 | 3/2008 | Gangi |
| 7,353,396 | B2 | 4/2008 | Micali et al. |
| 7,360,691 | B2 | 4/2008 | Takayama |
| 7,374,099 | B2 | 5/2008 | De Jong |
| 7,382,762 | B2 | 6/2008 | Chmora et al. |
| 7,392,378 | B1 | 6/2008 | Elliott |
| 7,395,535 | B2 | 7/2008 | Susser et al. |
| 7,469,151 | B2 | 12/2008 | Khan et al. |
| 7,478,389 | B2 | 1/2009 | Susser et al. |
| 7,502,946 | B2 | 3/2009 | Perkins et al. |
| 7,567,674 | B2 * | 7/2009 | Nishimoto et al. ............ 380/281 |
| 7,607,175 | B2 | 10/2009 | Susser et al. |
| 7,631,346 | B2 | 12/2009 | Hinton et al. |
| 7,631,810 | B2 | 12/2009 | Liu et al. |
| 7,708,198 | B2 | 5/2010 | Gangi |
| 7,712,658 | B2 | 5/2010 | Gangi |
| 7,739,731 | B2 | 6/2010 | Violleau et al. |
| 7,860,486 | B2 | 12/2010 | Frank et al. |
| 7,967,215 | B2 | 6/2011 | Kumar et al. |
| 8,120,460 | B1 | 2/2012 | Zhu |
| 8,126,806 | B1 | 2/2012 | DiMartino et al. |
| 8,150,767 | B2 | 4/2012 | Wankmueller |
| 8,171,137 | B1 | 5/2012 | Parks et al. |
| 8,171,525 | B1 | 5/2012 | Pelly et al. |
| 8,196,131 | B1 | 6/2012 | von Behren et al. |
| 8,255,687 | B1 | 8/2012 | Pelly et al. |
| 8,297,520 | B1 | 10/2012 | Wakerly et al. |
| 8,313,036 | B1 | 11/2012 | Wakerly et al. |
| 8,335,921 | B2 | 12/2012 | von Behren et al. |
| 8,335,932 | B2 | 12/2012 | von Behren et al. |
| 8,352,749 | B2 | 1/2013 | von Behren |
| 8,379,863 | B1 | 2/2013 | Pelly et al. |
| 8,385,553 | B1 | 2/2013 | Jooste et al. |
| 2001/0011250 | A1 | 8/2001 | Paltenghe et al. |
| 2001/0021927 | A1 | 9/2001 | Laurent et al. |
| 2001/0027441 | A1 | 10/2001 | Wankmueller |
| 2001/0039657 | A1 | 11/2001 | Fopeano et al. |
| 2002/0004783 | A1 | 1/2002 | Paltenghe et al. |
| 2002/0042776 | A1 | 4/2002 | Woo et al. |
| 2002/0068554 | A1 | 6/2002 | Dusse |
| 2002/0194138 | A1 | 12/2002 | Dominguez et al. |
| 2003/0023954 | A1 | 1/2003 | Wilkinson et al. |
| 2003/0074579 | A1 | 4/2003 | Della-Libera et al. |
| 2003/0140176 | A1 | 7/2003 | Susser et al. |
| 2004/0029569 | A1 | 2/2004 | Khan et al. |
| 2004/0030601 | A1 | 2/2004 | Pond et al. |
| 2004/0123152 | A1 | 6/2004 | Le Saint |
| 2004/0128259 | A1 | 7/2004 | Blakeley et al. |
| 2004/0140351 | A1 | 7/2004 | Flugge et al. |
| 2005/0001711 | A1 | 1/2005 | Doughty et al. |
| 2005/0071418 | A1 | 3/2005 | Kjellberg et al. |
| 2005/0091659 | A1 | 4/2005 | Susser et al. |
| 2005/0102679 | A1 | 5/2005 | Susser et al. |
| 2005/0149926 | A1 | 7/2005 | Saltz |
| 2005/0184163 | A1 | 8/2005 | de Jong |
| 2005/0184164 | A1 | 8/2005 | de Jong |
| 2005/0184165 | A1 | 8/2005 | De Jong |
| 2005/0188360 | A1 | 8/2005 | De Jong |
| 2005/0193218 | A1 | 9/2005 | Susser et al. |
| 2005/0222961 | A1 | 10/2005 | Staib et al. |
| 2006/0036570 | A1 | 2/2006 | Schaefer et al. |
| 2006/0041507 | A1 | 2/2006 | Novack et al. |
| 2006/0126831 | A1 | 6/2006 | Cerruti et al. |
| 2006/0165060 | A1 | 7/2006 | Dua |
| 2006/0219774 | A1 | 10/2006 | Benco et al. |
| 2007/0067325 | A1 | 3/2007 | Weitzner et al. |
| 2007/0090195 | A1 | 4/2007 | Kawamura et al. |
| 2007/0135164 | A1 | 6/2007 | Lee |
| 2007/0169043 | A1 | 7/2007 | Violleau et al. |
| 2007/0226786 | A1 | 9/2007 | Berger et al. |
| 2008/0056501 | A1 | 3/2008 | McGough et al. |
| 2008/0073426 | A1 | 3/2008 | Koh et al. |
| 2008/0130902 | A1 | 6/2008 | Foo Kune et al. |
| 2008/0162834 | A1 | 7/2008 | Brokenshire et al. |
| 2008/0167988 | A1 | 7/2008 | Sun et al. |
| 2008/0208681 | A1 | 8/2008 | Hammad et al. |
| 2008/0208762 | A1 | 8/2008 | Arthur et al. |
| 2008/0270253 | A1 | 10/2008 | Huang |
| 2009/0158028 | A1 | 6/2009 | Jung et al. |
| 2009/0239512 | A1 | 9/2009 | Hammad et al. |
| 2009/0261172 | A1 | 10/2009 | Kumar et al. |
| 2009/0307142 | A1 | 12/2009 | Mardikar |
| 2009/0312011 | A1 | 12/2009 | Huomo et al. |
| 2010/0012732 | A1 | 1/2010 | Pinzinger et al. |
| 2010/0042824 | A1 | 2/2010 | Lee et al. |
| 2010/0050271 | A1 | 2/2010 | Saarisalo |
| 2010/0058463 | A1 | 3/2010 | Bertin |
| 2010/0063893 | A1 | 3/2010 | Townsend |
| 2010/0088237 | A1 | 4/2010 | Wankmueller |
| 2010/0114731 | A1 | 5/2010 | Kingston et al. |
| 2010/0131413 | A1 | 5/2010 | Kranzley et al. |
| 2010/0138518 | A1 | 6/2010 | Aiglesorfer et al. |
| 2010/0203870 | A1 | 8/2010 | Hubinak et al. |
| 2010/0205432 | A1 | 8/2010 | Corda et al. |
| 2010/0207742 | A1 | 8/2010 | Buhot et al. |
| 2010/0211507 | A1 | 8/2010 | Aabye et al. |
| 2010/0250956 | A1 | 9/2010 | Reed et al. |
| 2010/0291896 | A1 | 11/2010 | Corda |
| 2010/0291904 | A1 | 11/2010 | Musfeldt et al. |
| 2010/0306076 | A1 | 12/2010 | Taveau et al. |
| 2010/0306107 | A1 | 12/2010 | Nahari |
| 2010/0306531 | A1 | 12/2010 | Nahari |
| 2010/0323681 | A1 | 12/2010 | Corda et al. |
| 2010/0330958 | A1 | 12/2010 | Corda et al. |
| 2011/0016275 | A1 | 1/2011 | Lemonnier et al. |
| 2011/0029671 | A1 | 2/2011 | Deprun et al. |
| 2011/0053504 | A1 | 3/2011 | Corda |
| 2011/0072425 | A1 | 3/2011 | Lemonnier et al. |
| 2011/0078081 | A1 | 3/2011 | Pirzadeh et al. |
| 2011/0087610 | A1 | 4/2011 | Batada et al. |
| 2011/0113473 | A1 | 5/2011 | Corda et al. |
| 2011/0131421 | A1 | 6/2011 | Jogand-Coulomb et al. |
| 2012/0009873 | A1 | 1/2012 | Corda et al. |
| 2012/0129452 | A1 | 5/2012 | Koh et al. |

(56) References Cited

U.S. PATENT DOCUMENTS

FOREIGN PATENT DOCUMENTS

| | | |
|---|---|---|
| EP | 1318488 A2 | 6/2003 |
| EP | 2043060 A1 | 4/2009 |
| GB | 2457221 A | 8/2009 |
| KR | 100600508 | 7/2005 |
| KR | 10-2006-0035421 | 4/2006 |
| KR | 10-2009-0051823 | 5/2009 |
| WO | WO 98/43212 A1 | 10/1998 |
| WO | WO 98/52158 A2 | 11/1998 |
| WO | WO 01/22374 | 3/2001 |
| WO | WO 2004/054125 | 6/2004 |
| WO | WO 2009/043859 A1 | 4/2009 |
| WO | WO 2010/150817 A1 | 12/2010 |

OTHER PUBLICATIONS

AN1787—MIFARE Application Directory (MAD), *NXP Semiconductors—MIFARE Application Directory*, pp. 1-23, Jul. 7, 2010.
Data Sheet: MIFARE—Standard Card IC—MF1 IC S50 Functional Specification, *Philips Semiconductors—Product Specification—Revision 4.0*, pp. 1-18, Jul. 1, 1998.
Santa Clare Put Payments in "Palm" of Your Hand: Palms and Cellphones Initiate Payments to Campus Card System, CR80 News. com, vol. 2(5), pp. 1-3, May 1, 2003.
Mobile Payments at the Physical Point-of-Sale: Assessing U.S. Market Drivers and Industry Direction, *Smart Card Alliance Report—Publication No. PT-05001*, pp. 1-52, Apr. 1, 2005.
Global Platform Card—Contactless Services, Card Specification v2.2—Amendment C, *Global Platform Public Release—Document Reference: GPC SPE 025*, pp. 1-77, Feb. 1, 2010.
The Role of the TSM, *Gemalto—The Review*, Jan. 1, 2008.
Smart-card Devices and Applications, pp. 1-13, Jan. 1, 2001.
Boly et al., ESCORICS 94 (Third European Symposium on Research in Computer Security) LNCS 875, pp. 217-230, Nov. 7, 1994.
Chen, Zhiqun, How to Write JAVA Card Applet: A Developer's Guide, *JavaWorld*, pp. 1-9, Jul. 1, 1999.
Corum, Chris, Card Offices Increase their Focus on Off-Campus Merchant Programs, CR80News.com, vol. 2(5), pp. 1-5, May 1, 2003.
Daswani, et al., SWAPEROO: A Simple Wallet Architecure for Payments, Exchanges, Refunds, and Other Operations, *USENIX—3rd USENIX Workshop on Electronic Commerce*, pp. 1-20, Aug. 31, 1998.
Dotzer, Florian, Aspectcs of Multi-Application Smart Card Management Systems, *Thesis of Technical University of Munich, Chair of Data Processing*, pp. 1-124, Oct. 15, 2002.

Hernandez-Suesta, Raul, E-Wallet with Decentralized Credential Keepers, *Masters Thesis—Norges Teknisk—Naturvitenskapelige Universitet*, pp. 1-74, Jun. 30, 2003.
Hernandez et al., E-Wallet Software Architecture with Decentralized Credentials, *Masters Thesis—Norwegian University of Science and Technology*, pp. 1-12, Jan. 1, 2003.
Huang et al., Future Personal "E-Payment"; IRFM, *IEEE Wireless Communications*, pp. 1-7, Feb. 1, 2006.
Mjolsnes et al., On-Line E-Wallet Systems with Decentralized Credential Keepers, *Mobile Networks and Applications*, vol. 8, pp. 1-13, Feb. 1, 2003.
Retrieved from http://www.europeanpaymentscouncil., EPC-GSMA Trusted Service Manager—Service Management Requirements and Specifications, retrieved from http://www.europeanpaymentscouncil., pp. 1-60, Jan. 1, 2010.
Song H., Office Action issued in co-pending U.S. Appl. No. 13/523,637, filed Jan. 14, 2012, pp. 1-6, Jul. 30, 2012.
Sun Microsystems, Inc., Runtime Environment Specification—Jave Card Platform, Version 3.0, Classic Edition, pp. 1-158, Mar. 1, 2008.
Yin, Sara, Google Wallet is Just Another Pilot, Says World's Largest SIM Card Maker, PCMag.com, pp. 3, May 27, 2011.
Yin Sara, Google Wallet Aims to Take Mobile Payments Mainstream, PCMag.com, pp. 1-2, May 26, 2011.
Yixin et al., Design of Objects Sharing Mechanisms with Security Domain in Java, *2009 International Conference on Electronic Computer Technology*, pp. 1-5, Feb. 20, 2009.
Yliuntinen, 3rd Part TSM Management of SIM Cards, *Cryptomathic*, pp. 1-5, Sep. 1, 2011.
Yun et al., Design and Implementation of Wireless Payment System using GVM and MobileC, *Proceedings of the International Conference on Mobile Computing and Ubiquitous Networking*, pp. 1-10, Apr. 13, 2005.
U.S. Appl. No. 13/244,777 to von Behren et al. filed Sep. 26, 2011.
U.S. Appl. No. 13/244,775 to von Behren et al. filed Sep. 26, 2011.
U.S. Appl. No. 13/244,781 to von Behren et al. filed Sep. 26, 2011.
U.S. Appl. No. 13/686,887 to von Behren et al. filed Nov. 27, 2012.
U.S. Appl. No. 13/717,686 to von Behren et al. filed Dec. 17, 2012.
U.S. Appl. No. 13/360,618 to von Behren et al. filed Jan. 27, 2012.
U.S. Appl. No. 13/618,166 to Wakerly et al. filed Sep. 14, 2012.
U.S. Appl. No. 13/752,355 to Pelly et al. filed Jan. 28, 2013.
U.S. Appl. No. 13/547,029 to Wall et al. filed Jul. 11, 2012.
Kim, S. G., International Search Report and Written Opinion for International Application No. PCT/US2013/035521, pp. 1-9, Jul. 25, 2013.
Schossmaier, K., EPO Search Report issued Appl. No. 12769000.6, pp. 1-3, Jul. 31, 2013.
Song, H., Office Action in copending U.S. Appl. No. 13/752,355, filed Jan. 28, 2013, pp. 1-9, Aug. 27, 2013.

* cited by examiner

PORTABLE SECURE ELEMENT

RELATED APPLICATIONS

This patent application is a continuation of and claims priority to U.S. patent application Ser. No. 13/523,637, filed Jun. 14, 2012 and entitled "Portable Secure Element," which claims priority under 35 U.S.C. §119 to U.S. Provisional Patent Application No. 61/604,503, entitled "Portable Secure Element," filed Feb. 28, 2012. The entire contents of the above-identified applications are hereby fully incorporated herein by reference.

TECHNICAL FIELD

The present disclosure relates generally to a mobile communication device, and more particularly to methods and systems that enable users to select from available trusted service managers ("TSMs") for completing secure transactions, communications, and other tasks.

BACKGROUND

The current near field communication ("NFC") eco-system relies on a piece of hardware commonly referred to as a "secure element" installed on communication devices to provide a secure operation environment for financial transactions, transit ticketing, identification and authentication, physical security access, and other functions. A secure element generally includes its own operating environment with a tamper-proof microprocessor, memory, and operating system. A trusted service manager ("TSM"), among other things, installs, provisions, and personalizes the secure element. The secure element has one or more access keys that are typically installed at manufacture time. A corresponding key is shared by the TSM so that the TSM can establish a cryptographically secure channel to the secure element for installation, provisioning, and personalization of the secure element while the device having the secure element is in the possession of an end user. In this way, the secure element can remain secure even if the host CPU in the device has been compromised.

One deficiency with current NFC systems is that a tight coupling exists between the secure element and the TSM. For current deployments, only one TSM has access to the keys of a particular secure element. Therefore, the end user can choose to provision secure element features that are supplied by the one TSM only. This TSM typically is chosen by the manufacturer of the device. For example, a smart phone manufacturer may select the TSM for smart phones under guidance from a mobile network operator ("MNO"), such as Sprint or Verizon, that purchases the smart phone rather than the end user. Thus, the TSM features available to the end user may not be in the end user's interest. As an example, the MNO may have a business relationship with one payment provider, such as MasterCard or Bank of America, only. That TSM may allow the secure element to be provisioned with payment instructions from the one payment provider only. Thus, the end user would not be able to access services from other payment providers, such as VISA.

SUMMARY

In certain exemplary aspects, a method and system of transferring control of a secure element between TSMs comprises a zone master key established between the TSMs that facilitates encryption of a temporary key during the transfer process. The TSMs establish an agreement to and create a zone master key prior to the initiation of a transfer of control. Once a transfer of control is initiated, the first TSM establishes a communication channel with the secure element and deletes its key. The first TSM creates a temporary key. The temporary key is encrypted with the zone master key established between the first TSM and the second TSM and the encrypted temporary key is communicated to the second TSM with a device identifier. The second TSM decrypts the temporary key using the zone master key and identifies the user device using the device identifier. The new TSM establishes a secure communication channel with the secure element and deletes the temporary key. The new TSM then inputs and saves its key into the secure element. In one exemplary aspect, the first TSM may transfer control of the secure element to a mediator TSM, which then transfers control of the secure element to the second TSM.

These and other aspects, objects, features, and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF EXEMPLARY EMBODIMENTS

Overview

The exemplary embodiments provide methods and systems that enable users to transfer control of a secure element from one TSM to another using a zone master key established between the TSMs. The TSMs establish an agreement to and create a zone master key prior to the initiation of a transfer of control. The zone master key facilitates encryption of a temporary key used to transfer control from one TSM to another. In an exemplary embodiment, the zone maser key is a shared symmetric key. The temporary key exchange may occur by encrypting the temporary key with a pre-shared symmetric key. In an alternative exemplary embodiment the temporary key exchange may occur by making use of PKI infrastructure, in which the temporary keys can be encrypted by the source TSM (for example, TSM A) with the public key published by the target TSM (for example, TSM B). In an exemplary embodiment, control of the secure element may be transferred from TSM A directly to TSM B using a temporary key encrypted by the zone master key established between TSM A and TSM B. In an alternative exemplary embodiment, control of the secure element may be transferred from TSM A to an intermediary, such as a mobile network operator ("MNO") TSM, before transfer to TSM B, using one or more temporary keys. The first temporary key may be encrypted by the zone master key established between TSM A and the MNO TSM and the second temporary key may be encrypted by the zone master key established between the MNO TSM and TSM B. In an alternative exemplary embodiment, a single temporary key may be used to transfer control from TSM A to the MNO TSM to TSM B.

Once a transfer of control is initiated, the TSM A receives instructions and agrees to transfer control to a second TSM, for example TSM B or a mediator TSM (such as the MNO TSM). TSM A establishes a communication channel with the secure element and deletes its key. TSM A creates a temporary key and saves it to the secure element. TSM A encrypts the temporary key with the zone master key established between TSM A and the second TSM. The encrypted temporary key is communicated to the second TSM with a device identifier. The second TSM decrypts the temporary key using the zone master key and identifies the user device using the device identifier.

The second TSM establishes a communication channel with the secure element using the temporary key. Once a communication channel is established, the second TSM deletes the temporary key from the secure element. The second TSM then inputs and saves its key into the secure element, thereby assuming control of the secure element. In an exemplary embodiment, the second TSM is the mediator TSM and control is then transferred to TSM B using the same methods. In an exemplary embodiment the mediator TSM is a MNO TSM. In an alternative exemplary embodiment, the mediator TSM is a third party entity such as Google. In yet another alternative exemplary embodiment the mediator TSM is an operating system or operating system provider such as Android.

The functionality of the exemplary embodiments will be explained in more detail in the following description, read in conjunction with the figures illustrating the program flow.

System Architecture

Turning now to the drawings, in which like numerals indicate like (but not necessarily identical) elements throughout the figures and exemplary embodiments are described in detail.

Figure 1:
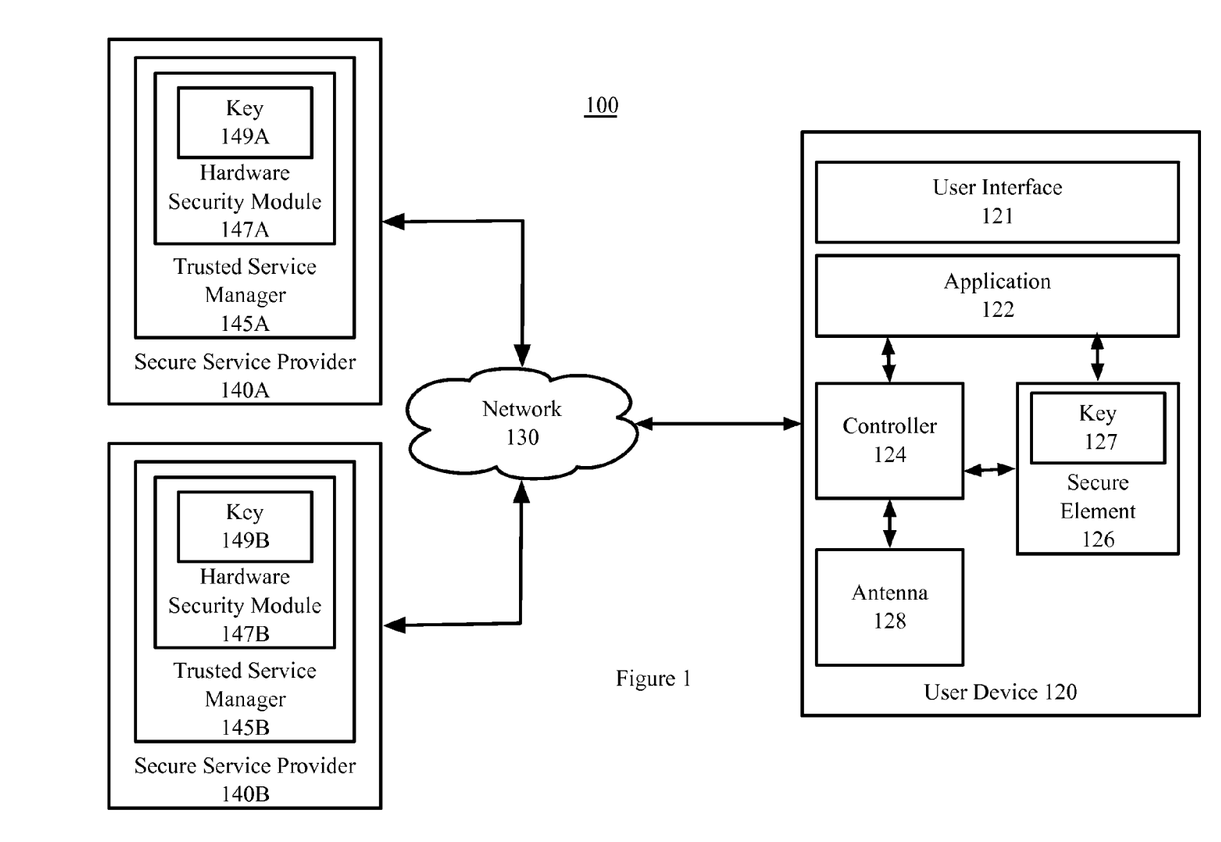
FIG. 1 is a block diagram depicting an operating environment for a system for transferring control of a secure element using a zone master key according to an exemplary embodiment.

FIG. 1 is a block diagram depicting an operating environment 100 for a system for transferring control of a secure element 126 using a zone master key according to an exemplary embodiment. As depicted in FIG. 1, the exemplary operating environment 100 comprises a user device system 120 and two or more secure service provider systems 140 that are configured to communicate with one another via one or more networks 130.

The network 130 comprises a telecommunication means by which network devices (including devices 120 and 140) can exchange data. For example, the network 130 can be implemented as, or may be a part of, a storage area network ("SAN"), personal area network ("PAN"), local area network ("LAN"), a metropolitan area network ("MAN"), a wide area network ("WAN"), a wireless local area network ("WLAN"), a virtual private network ("VPN"), an intranet, the Internet, Bluetooth, NFC or any other appropriate architecture or system that facilitates the communication of signals, data and/or messages (generally referred to as data). In an alternative exemplary embodiment, the secure communication channel 130 can comprise a cellular network.

In an exemplary embodiment, the user device system 120 can refer to a smart device that can communicate via an electronic, magnetic, or radio frequency field between the device 120 and another device, such as a smart card (not illustrated) or a reader (not illustrated). In an exemplary embodiment, the user device 120 has processing capabilities, such as storage capacity/memory and one or more applications 122 that can perform a particular function. In an exemplary embodiment, the contactless device 120 contains an operating system (not illustrated) and user interface 121. Exemplary contactless devices 120 include smart phones; mobile phones; personal digital assistants ("PDAs"); mobile computing devices, such as netbooks, tablets, and iPads; laptops; and other devices, in each case having processing and user interface functionality.

The contactless device 120 also comprises a secure element 126, which can exist within a removable smart chip or a secure digital ("SD") card or which can be embedded within a fixed chip on the device 120. In certain exemplary embodiments, Subscribed Identity Module ("SIM") cards may be capable of hosting a secure element 126, for example, an NFC SIM Card. The secure element 126 allows a software application (not illustrated) resident on the device 120 and accessible by the device user to interact securely with certain functions within the secure element 126, while protecting information stored within the secure element. The secure element 126 may comprise applications (not illustrated) running thereon that perform the functionality described herein.

The secure element 126 includes components typical of a smart card, such as crypto processors and random generators. In an exemplary embodiment, the secure element 126 comprises a Smart MX type NFC controller 124 in a highly secure system on a chip controlled by a smart card operating system, such as a JavaCard Open Platform ("JCOP") operating system. In another exemplary embodiment, the secure element 126 is configured to include a non-EMV type contactless smart card, as an optional implementation.

The secure element 126 communicates with the controller 124 and the application 122 in the user device 120. In an exemplary embodiment, the secure element 126 is capable of storing encrypted user information and only allowing trusted applications to access the stored information. The controller 124 interacts with a secure key 127 encrypted application for decryption and installation in the secure element 126.

In an exemplary embodiment, the controller 124 is an NFC controller. The NFC controller may be capable of sending and receiving data, identifying a reader or smart card, performing authentication and ciphering functions, and directing how the user device 120 will listen for transmissions from reader/smart card or configure the user device 120 into various power-save modes according to the NFC-specified procedures. In an alternative exemplary embodiment, the controller 124 is a Bluetooth link controller or a Wi-Fi controller capable of performing similar functions.

The application 122 is a program, function, routine, applet or similar entity that exists on and performs its operations on the user device 120. For example, the application 122 may be one or more of an offline payment application, a digital wallet application, a coupon application, a loyalty card application, another value-added application, a user interface application, or other suitable application operating on the contactless device 120. Additionally, the secure element 126 also may comprise secure contactless software applications, such as an offline payment or other payment applications, secure forms of the applications 122, authentication applications, payment provisioning applications, or other suitable application using the secure functionality of the secure element.

The user device 120 communicates with the reader/smart card via an antenna 128. In an exemplary embodiment, once the user device application 122 has been activated and prioritized, the controller 124 is notified of the state of readiness of the user device 120 for a transaction. The controller 124 outputs through the antenna 128 a radio signal, or listens for radio signals from the reader/smart card.

A secure service provider 140 serves as an intermediary that assist service providers in securely distributing and managing applications and services, such as NFC contactless applications services. Exemplary secure services providers 140 comprise Gemalto and First Data. A trusted service manager ("TSM") 145 of the secure service provider 140 typically hosts the applications and installs and provisions the applications onto the secure element 126 of the user device. Each TSM 145 can receive, store and utilize a key 149 for a secure element 126 resident on a user device 120. In an exemplary embodiment, one or more keys 149 are stored in a hardware security module ("HSM"). By having the keys 149, the TSM 145 can access the secure element 126 via a secure encrypted communication channel to install, provision, and customize applications within the secure element 126. In an exemplary embodiment, the key 149 allows access and control of the secure element 126 only by the TSM 147 with the current access key 149. For example, once control of the secure element 126 is transferred from TSM A 147A to TSM B 147B, only TSM B 147 can access and control the secure element 126 using the TSM B key 149B. The TSM A key 149A will not permit allow access and control of the secure element 126 by TSM A 145A.

In certain exemplary embodiments, the secure service providers 140 bypass the controller 124 resident on the user device 120 when communicating with the secure element 126. For example, in certain UICC/SIM secure elements, the secure service providers 140 communicate with the secure element 126 via a radio CPU (not illustrated) installed on the user device 120. Thus, the involvement of the controller 124 may be optional during the provisioning of applications on the secure element 126 in certain exemplary embodiments. In certain exemplary embodiments, a host CPU (not illustrated) and a radio CPU (not illustrated) interact with one another to coordinate access controls to the secure element 126.

Figure 2:
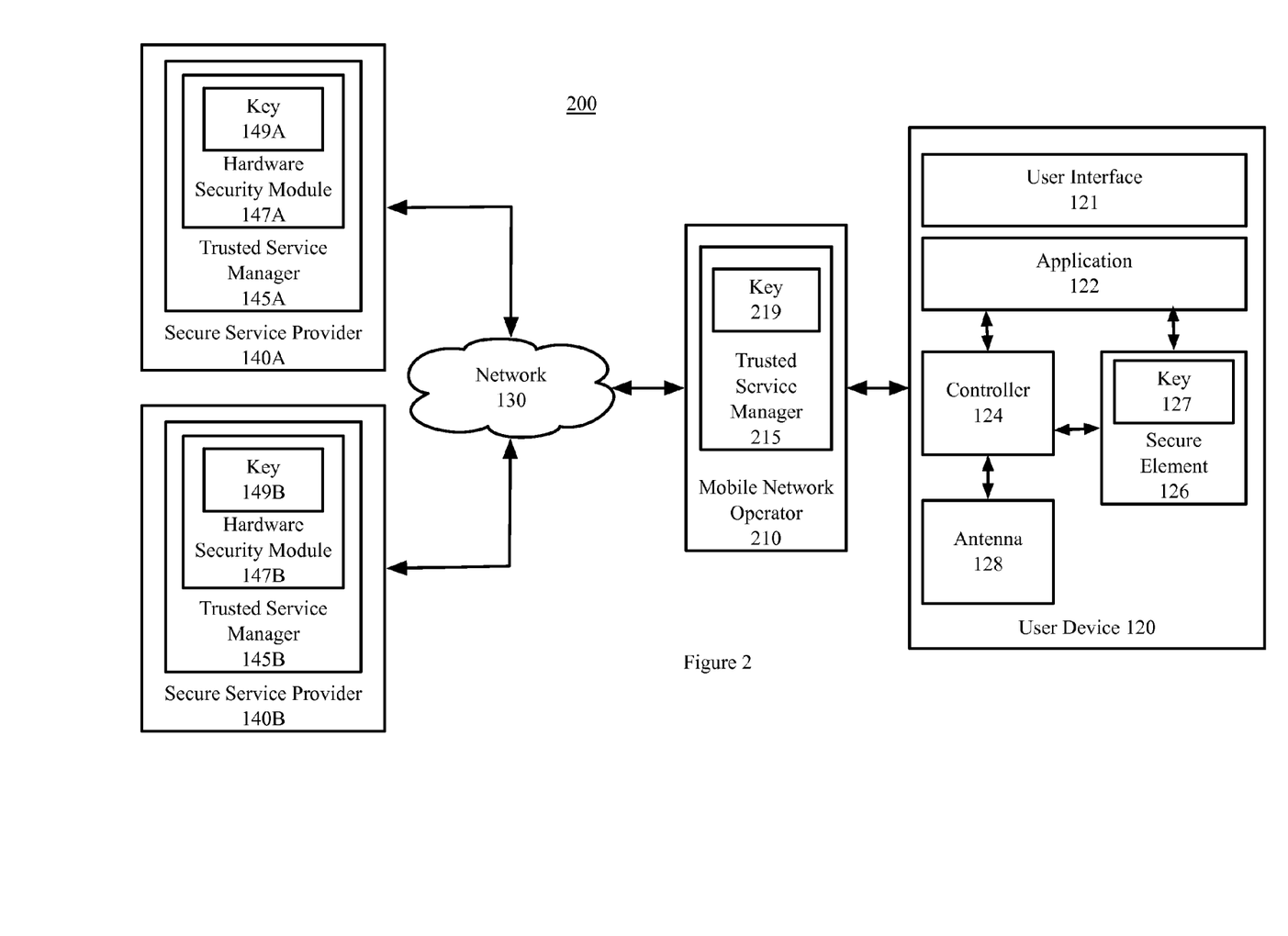
FIG. 2 is a block diagram depicting an operating environment for a system for device-mediated transfer of control of a secure element according to an exemplary embodiment.

FIG. 2 is a block diagram depicting an operating environment for a system for device-mediated transfer of control of a secure element according to an alternative exemplary embodiment. The exemplary operating environment 200 comprises many of the same components as the system 100, including a user device system 120 and two or more secure service provider systems 140 that are configured to communicate with one another via one or more networks 140. The exemplary operating environment 200 also comprises a mobile network operator ("MNO") system 210.

In an exemplary embodiment, the MNO system 210 is a third party system that acts as a mediator during the transfer of control from one TSM 145 to another. An exemplary MNO 210 comprises a TSM 215 and one or more keys 219. The TSM 215 and key 219 function in a similar manner as the TSM 145 and key 149 resident on the secure service provider 140, described previously. In an exemplary embodiment, the user device 120 accesses the network 130 via the MNO 210. Exemplary MNOs 210 comprise Verizon, Sprint, and AT&T. The MNO 210 may provide network 130 access to the user devices 120 via a mobile network (not shown), such as a 3G or 4G mobile communication network. In an alternative exemplary embodiment, the user device 120 can access the network 130 via other mechanisms, such as Wi-Fi in connection with an Internet provider, NFC or Bluetooth.

As referred to in this specification the MNO TSM 215 is a mediator TSM. In an exemplary embodiment the mediator TSM is a MNO TSM 215. In an alternative exemplary embodiment, the mediator TSM is a third party entity such as Google or an operating system/operating system provider such as Android. In this exemplary embodiment, the MNO system 210 can communication with the user device using any network 130 and the mediator TSM 215 can communicate with the user device 120 via Wi-Fi.

The components illustrated in FIGS. 1-2 will be described in further detail hereinafter with reference to the methods depicted herein.

System Process

Figure 3:
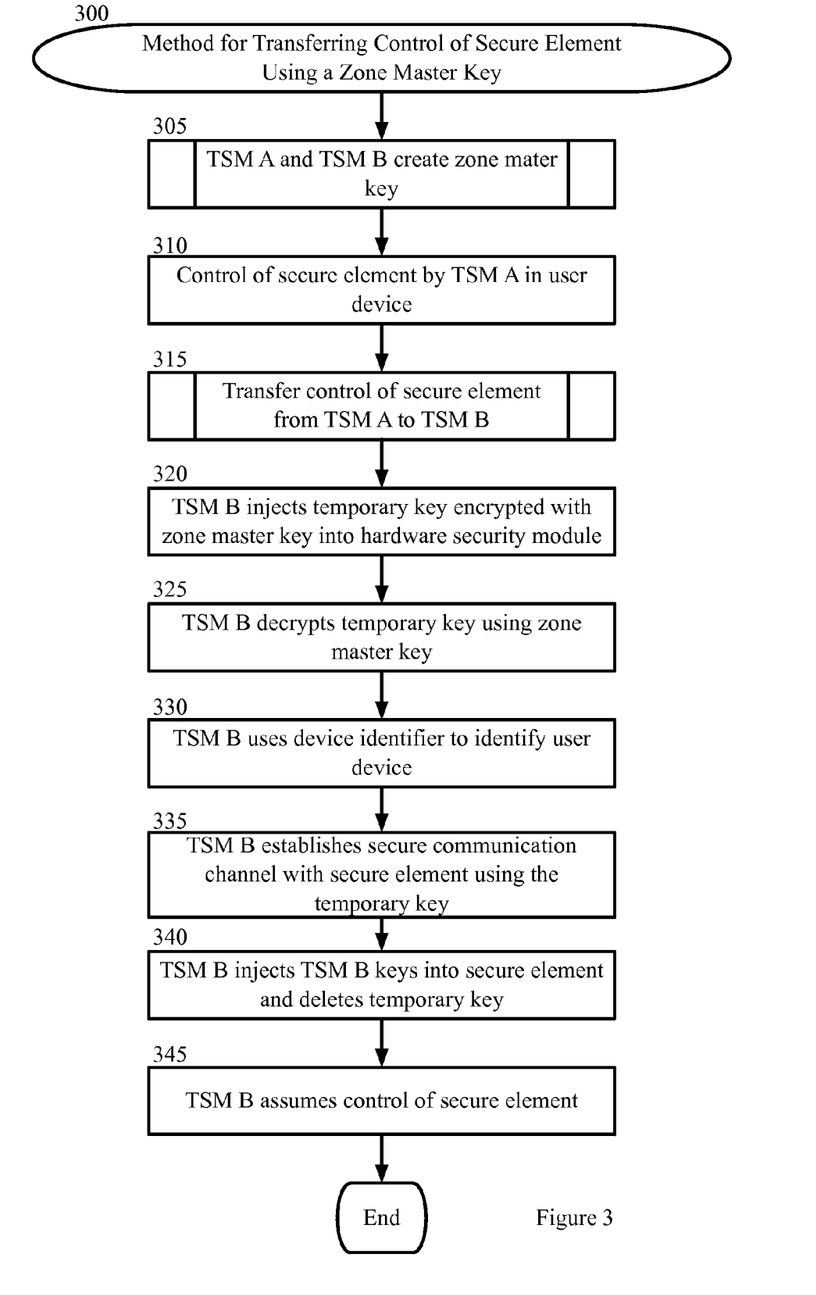
FIG. 3 is a block flow diagram depicting a method for transferring control of a secure element using a zone master key according to an exemplary embodiment.

FIG. 3 is a block flow diagram depicting a method for transferring control of a secure element 126 using a zone master key according to an exemplary embodiment. The method 300 is described with reference to the components illustrated in FIG. 1.

In block 305, TSM A 145A and TSM B 145B create a zone master key to facility the transfer of control. The method of creating a zone master key is described in more detain hereinafter with reference to the methods described in FIG. 4.

Figure 4:
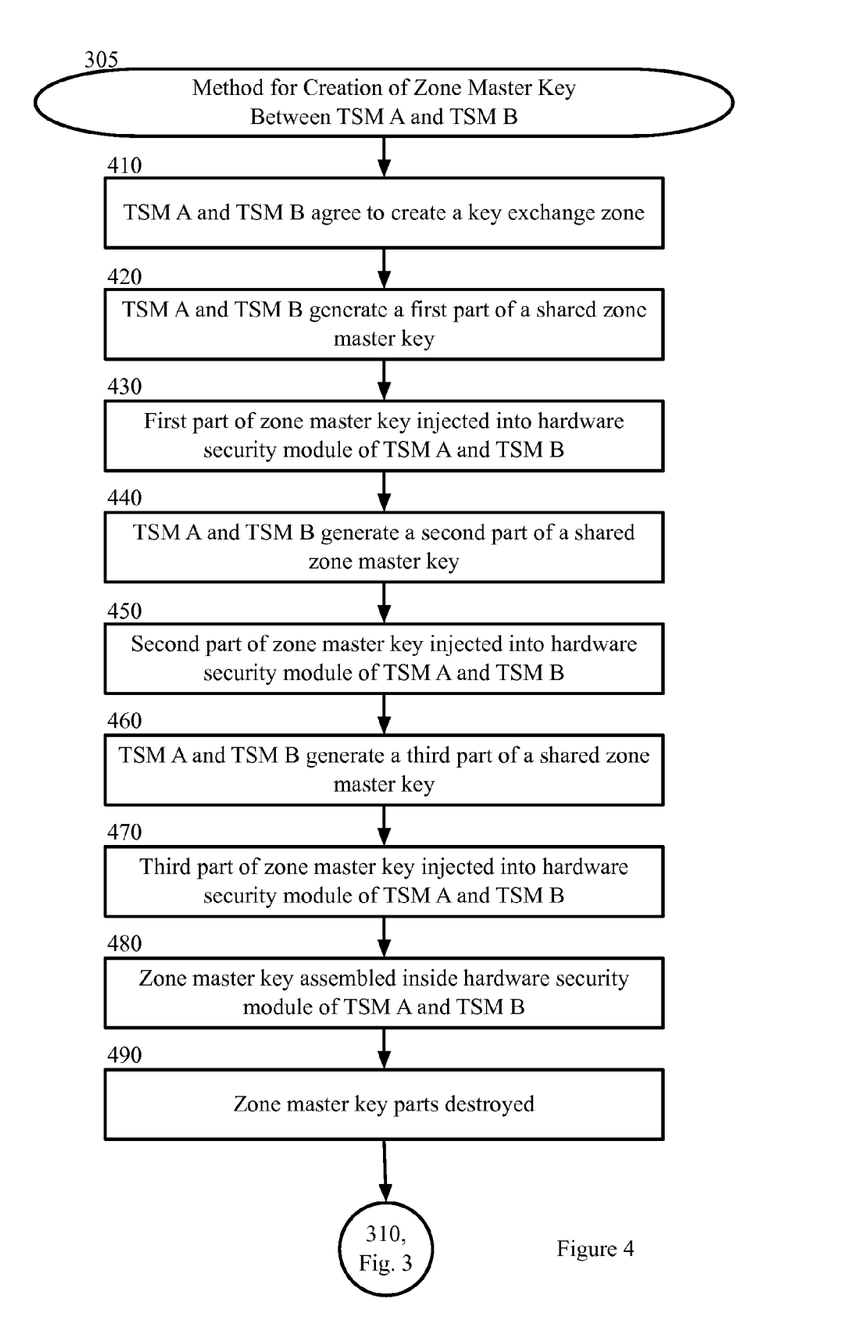
FIG. 4 is a block flow diagram depicting a method for creating a zone master key according to an exemplary embodiment.

FIG. 4 is a block flow diagram depicting a method for creating a zone master key according to an exemplary embodiment, as referenced in block 305 of FIG. 3. The method 305 is described with reference to the components illustrated in FIG. 1.

In block 410, TSM A 145A and TSM B 145B agree to create a key exchange zone. In an exemplary embodiment, the agreement between TSM A 145A and TSM B 145B occurs offline at a time prior to the initiation of transfer of control of a secure element 126 resident on a user device 120. For example, TSM A 145A and TSM B 145B may create an agreement to allow for the transfer of control of a secure element 126, wherein TSM A 145A and TSM B 145B agree to create a zone master key to facilitate such a transfer. In an exemplary embodiment, the zone master key may be used to facilitate a transfer from TSM A 145A to TSM B 145B, or vice versa, for multiple user devices at any time after the creation of the key.

In block 420, TSM A 145A and TSM B 145B generate a first part of a shared zone master key. In an exemplary embodiment, the zone master key is created in three separate parts to be assembled by the HSM 147. In an alternative exemplary embodiment, the zone master key is created in a single part. In this embodiment, the methods described in blocks 440 through 470 may be skipped. In yet another alternative exemplary embodiment, the zone master key is created in more than three parts. In this embodiment, the methods described in blocks 420 through 470 may be repeated as required. In yet another alternative exemplary embodiment, the zone master key is created in two parts. In this embodiment, the methods described in blocks 460 through 470 may be skipped.

In block 430, the first part of the zone master key is injected into the HSM 147 of TSM A 145A and TSM B 145B. In an exemplary embodiment, the zone master key parts are injected in the HSM 147A of TSM A 145A and in the HMS 147B or TSM B 145B. In an exemplary embodiment, the TSM 145 inputs the zone master key parts and stores the parts in the HSM 147. In an exemplary embodiment, once all parts of the zone master key are stored in the HSM 147, the HSM 147 assembles the parts.

In block 440, TSM A 145A and TSM B 145B generate a second part of the shared zone master key.

In block 450, the second part of the zone master key is injected into the HSM 147 of TSM A 145A and TSM B 145B. In an exemplary embodiment, the TSM 145 inputs the zone master key parts and stores the parts in the HSM 147. In an exemplary embodiment, once all parts of the zone master key are stored in the HSM 147, the HSM 147 assembles the parts.

In block 460, TSM A 145A and TSM B 145B generate a third part of the shared zone master key. In an exemplary embodiment, the zone master key is generated in three parts.

In block 470, the third part of the zone master key is injected into the HSM 147 of TSM A 145A and TSM B 145B. In an exemplary embodiment, the TSM 145 inputs the zone master key parts and stores the parts in the HSM 147. In an exemplary embodiment, once all parts of the zone master key are stored in the HSM 147, the HSM 147 assembles the parts.

In block 480, the zone master key is assembled inside the HSM 147 of TSM A 145A and TSM B 145B. In an exemplary embodiment, the three parts of the zone master key created, inputted and stored in the HSM 147 of TSM A 145A and TSM B 145B are assembled to create a single key.

In block 490, the zone master key parts are destroyed. In an exemplary embodiment, once the zone master key parts are assembled and a single key is created, the part injected into the HSM 147 of TSM A 145A and TSM B 145B are each removed from the HSM 147 and destroyed.

From block 490, the method proceeds to block 310 in FIG. 3.

Returning to FIG. 3, in block 310, control of the secure element 126 resident on the user device 120 is by TSM A 145A. In an exemplary embodiment, TSM A 145A can access and control of the secure element 126 using the access key 149A. In an exemplary embodiment, control of the secure element 126 may be by TSM B 145B, with control being transferred from TSM B 145B to TSM A 145A.

In block 315, control of the secure element 126 is transferred from TSM A 145A to TSM B 145B. The method for transferring control of the secure element 126 from TSM A 145A to TSM B 145B is described in more detain hereinafter with reference to the methods described in FIG. 5.

Figure 5:
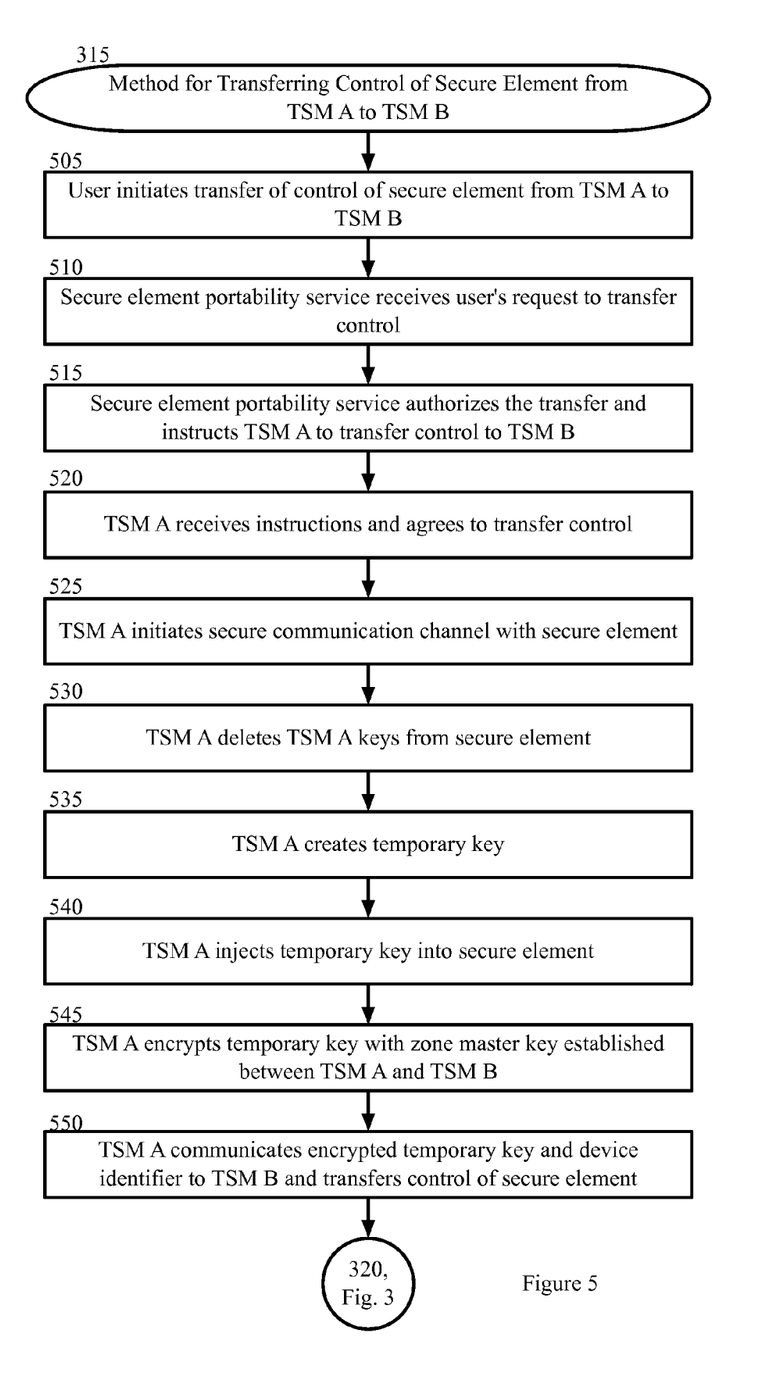
FIG. 5 is a block flow diagram depicting a method for transferring control of a secure element from TSM A to TSM B according to an exemplary embodiment.

FIG. 5 is a block flow diagram depicting a method for transferring control of the secure element 126 from TSM A 145A to TSM B 145B according to an exemplary embodiment, as referenced in block 315 of FIG. 3. The method 315 is described with reference to the components illustrated in FIG. 1.

In block 505, the user (not illustrated) initiates a transfer of control of the secure element 126 from TSM A 145A to TSM B 145B. In an exemplary embodiment, the user may access an application 122 resident on the user device via the user interface 121 to initiate a transfer of control. In an alternative exemplary embodiment, the user may initiate a transfer of control by registering a financial card is managed by secure service provider B 140B in the user's digital wallet application. In yet another alternative exemplary embodiment, the transfer of control may be initiated automatically with the user attempts to make a financial payment with the user device 120, wherein the financial card is managed by secure service provider B 140B.

In block 510, the application 122 resident on the user device 120 receives the user's request to transfer control of the secure element 126. In an exemplary embodiment, the application 122 is a secure element 126 portability service application.

In block 515, the application 122 authorizes the transfer of control from TSM A 145A to TSM B 145B and instructs TSM A 145A to transfer control of the secure element 126 to TSM B 145B. In an exemplary embodiment, the secure element portability service application 122 communicates instructions to TSM A 145A via the network 130.

In block 520, TSM A 145A receives the instructions and agrees to transfer control of the secure element 126 to TSM B 145B. In an exemplary embodiment, TSM A 145A has previously established an agreement with TSM B 145B regarding the transfer of control of a secure element 126 between the TSMs. The TSMs have previously created a zone master key to facilitate the transfer of such control. In an exemplary embodiment, once TSM A 145A receives instructions to transfer control, it confirms the existence of a transfer agreement between the TSMs before agreeing to transfer control.

In block 525, TSM A 145A initiates a secure communication channel with the secure element 126 using existing access keys of TSM A 145A stored in the secure element 126. In an exemplary embodiment, the secure communication channel is via the network 130.

In block 530, TSM A 145A deletes all TSM A keys 149A from the secure element 126. In an exemplary embodiment, removal of the TSM A keys 149A from the secure element 126 ensure that TSM A 145A will no longer have control or access to the secure element 126.

In block 535, TSM A 145A creates a temporary key. In an exemplary embodiment, the temporary key is different from the TSM A key 149 previously deleted from the secure element 126. In an exemplary embodiment, the temporary key provides for the transfer of control from one TSM 145 to another.

In block 540, TSM A 145A injects the temporary key into the secure element 126. In an exemplary embodiment, TSM A 145A inputs and stores the temporary key in the secure element 126 to facilitate the transfer of control to TSM B 145B.

In block 545, TSM A 145A encrypts the temporary key with the zone master key established between TSM A 145A and TSM B 145B. In an exemplary embodiment, the zone master key is shared by TSM A 145A and TSM B 145B and was created in block 305.

In block 550, TSM A 145A communicates the temporary key encrypted with the zone master key established between TSM A 145A and TSM B 145, along with the user device 120 identifier to TSM B 145B. In an exemplary embodiment, the user device 120 identifier may be used by TSM B 145B to identify the user device 120 and secure element 126 prior to accessing the secure element 126 and establishing control.

The method then proceeds to block 320 in FIG. 3.

Returning to FIG. 3, in block 320, TSM B 145B injects the temporary key encrypted with the zone master key received from TSM A 145A into the HSM 147B. In an exemplary embodiment, TSM B 145B inputs and saves the temporary key encrypted with the zone master key into the HSM 147B.

In block 325, TSM B 145B decrypts the temporary key using the zone master key established between TSM A 145A and TSM B 145B.

In block 330, TSM B 145B identifies the user device 120 using the device identifier communicated by TSM A 145A. In an exemplary embodiment, TSM B 145B contacts the MNO 210 to identify the user device 120 using the device identifier. In an exemplary embodiment, the MNO 210 facilitates identification of the user device 120 and secure element 126.

In block 335, TSM B 145B establishes a secure communication channel with the secure element 126 using the temporary key. In an exemplary embodiment, the secure communication channel is via the network 130.

In block 340, TSM B 145B deletes the temporary key from the secure element 126 and injects the TSM B key 149B. In an exemplary embodiment, TSM B 145B inputs the TSM B key 149B and saves it to the secure element 126 to assume control of the secure element 126. In an exemplary embodiment, TSM A 145A can no longer access or control the secure element once the temporary key is removed from the secure element by TSM B 145B.

In block 345, TSM B 145B assumes control of the secure element 126. In an exemplary embodiment, the communication channel is terminated at any suitable time after TSM B 145B inputs and saves the TSM B key 149B to the secure element.

From block 345, the method 300 ends.

Figure 6:
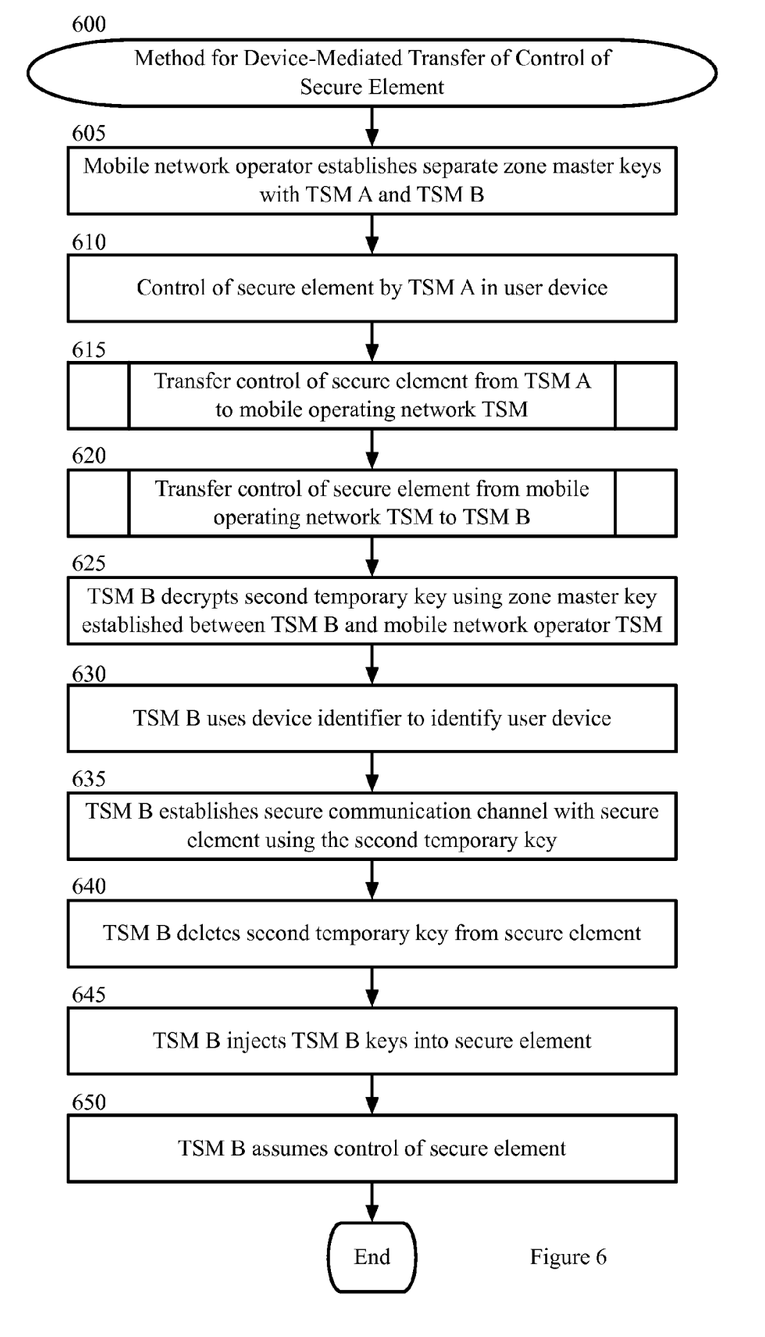
FIG. 6 is a block flow diagram depicting a method for device-mediated transfer of control of a secure element according to an exemplary embodiment.

FIG. 6 is a block flow diagram depicting a method for device-mediated transfer of control of a secure element 126 according to an exemplary embodiment. The method 600 is described with reference to the components illustrated in FIG. 2.

In block 605, the MNO TSM 215 establishes separate zone master keys with TSM A 145A and TSM B. In an exemplary embodiment, block 605 of FIG. 6 can be performed in a manner described previously with reference to block 305 of FIGS. 3-4, except the MNO TSM 215 performs the method 305 separately with each of the TSM A 145A and the TSM B 145B. In an exemplary embodiment, the MNO TSM 215 is a mediator that can include a MNO, third party entity, an operating system, an operating system provider or other TSM facilitating the transfer of control of the secure element 126 from one TSM 145 to another.

In block 610, control of the secure element 126 resident on the user device 120 is by TSM A 145A. In an exemplary embodiment, TSM A 145A can access and control of the secure element 126 using the access key 149A. In an exemplary embodiment, control of the secure element 126 may be by TSM B 145B, with control being transferred from TSM B 145B to TSM A 145A.

In block 615, control of the secure element 126 is transferred from TSM A 145A to the MNO TSM 215. The method 615 for transferring control of the secure element 126 from TSM A 145A to the MNO TSM 215 is described in more detail hereinafter with reference to the methods described in FIG. 7.

Figure 7:
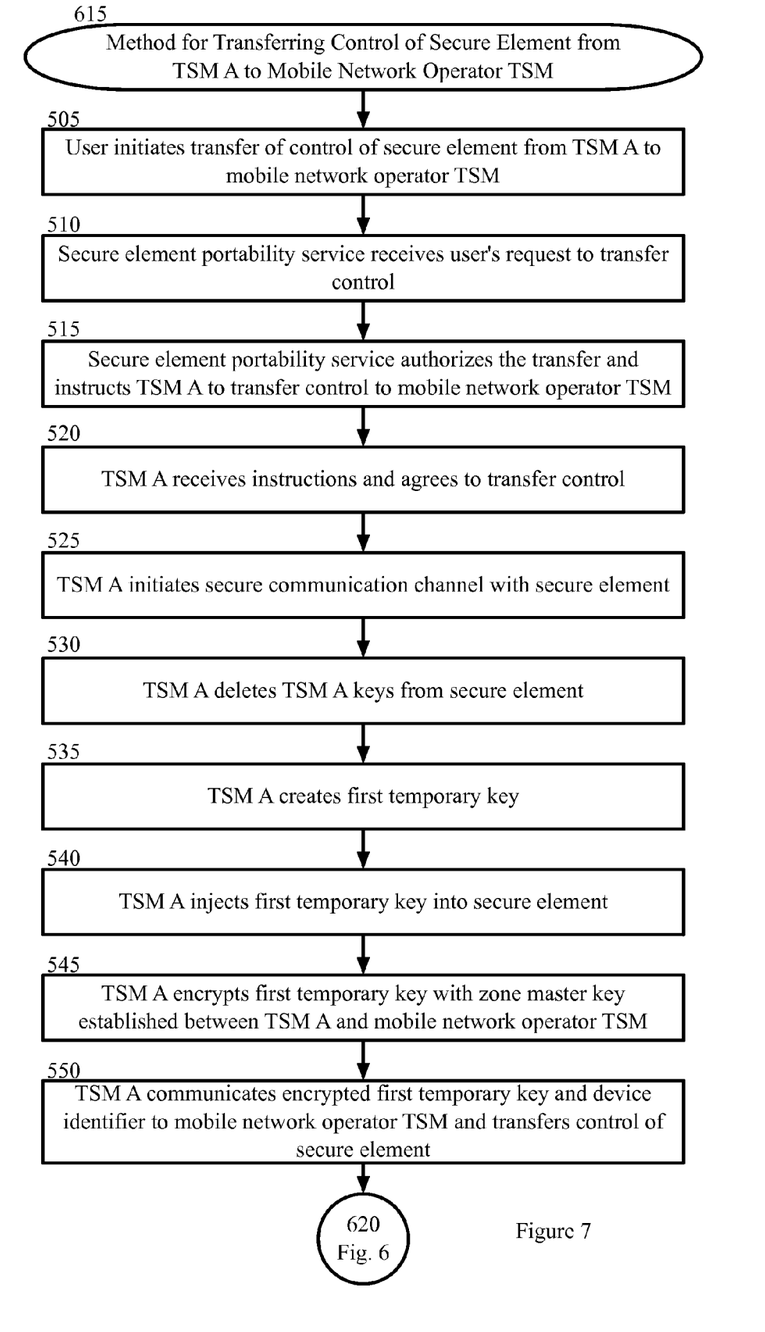
FIG. 7 is a block flow diagram depicting a method for transferring control of a secure element from TSM A to a mobile network operator TSM according to an exemplary embodiment.

FIG. 7 is a block flow diagram depicting a method for transferring control of a secure element 126 from TSM A 145A to the MNO TSM 215 according to an exemplary embodiment, as referenced in block 615 of FIG. 6. The method 615 is described with reference to the components illustrated in FIGS. 1-2.

In an exemplary embodiment, blocks 505 through 550 of FIG. 7 can be performed in a manner described previously with reference to blocks 505 through 550 of FIG. 5, except that TSM A 145A transfers control of the secure element 126 to the MNO TSM 215 instead of TSM B 145B. In an exemplary embodiment, transfer of control from TSM A 145A to the MNO TSM 215 is facilitated by the creation of a first temporary key encrypted by the zone master key established between TSM A 145A and the MNO TSM 215, according to the methods described previously with reference to blocks 505 through 550 of FIG. 5.

From block 550 of FIG. 7, the method 615 proceeds to block 620 of FIG. 6.

Returning to FIG. 6, in block 620, control of the secure element 126 is transferred from the MNO TSM 215 to TSM B 145B. The method 620 for transferring control of the secure element 126 from the MNO TSM 215 to TSM B 145B is described in more detail hereinafter with reference to the methods described in FIG. 8.

Figure 8:
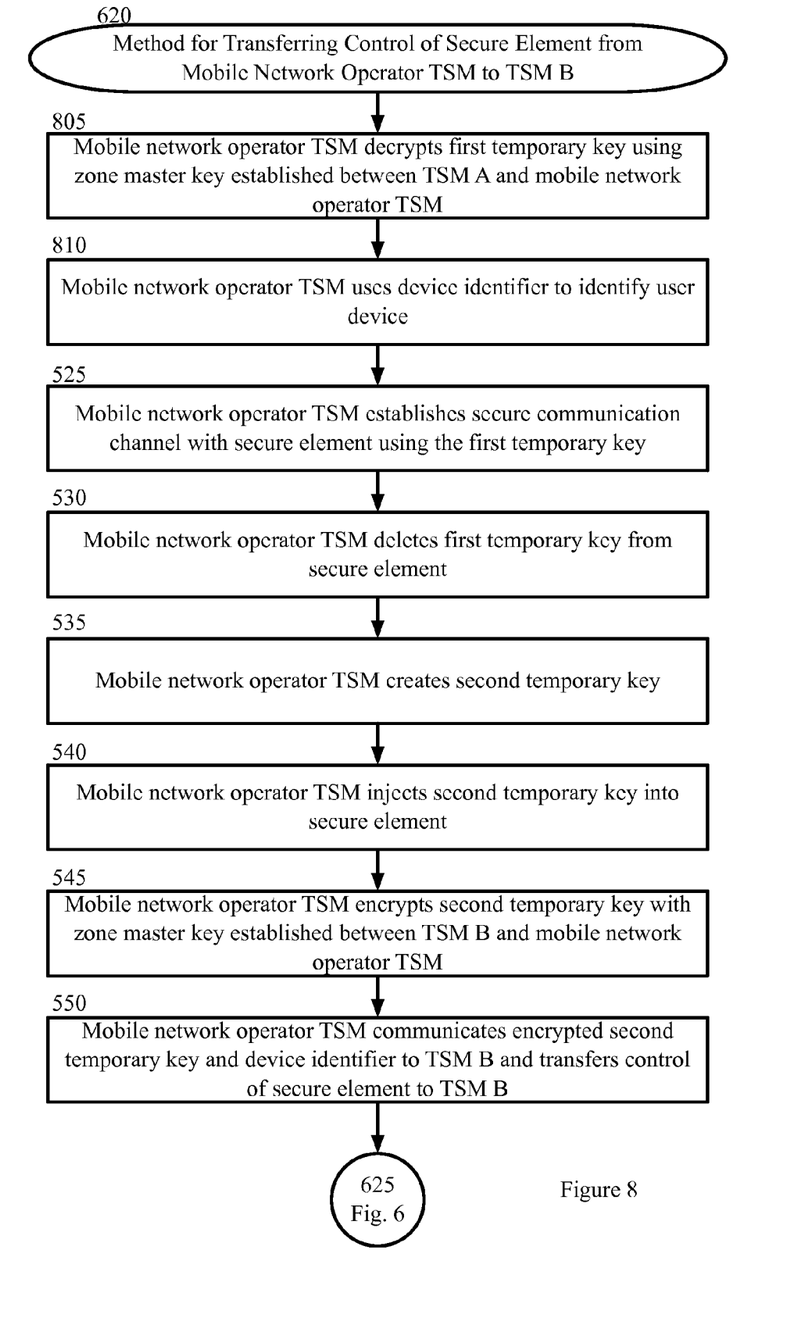
FIG. 8 is a block flow diagram depicting a method for transferring control of a secure element from a mobile network operator TSM to TSM B according to an exemplary embodiment.

FIG. 8 is a block flow diagram depicting a method for transferring control of a secure element 126 from the MNO TSM 215 to TSM B 145B according to an exemplary embodiment, as referenced in block 620 of FIG. 6. The method 620 is described with reference to the components illustrated in FIGS. 1-2.

In block 805, the MNO TSM 215 decrypts the first temporary key using the zone master key established between the MNO TSM 215 and the TSM A 145A.

In block 810, the MNO TSM 215 uses the device identifier to identify the user device 120.

In an exemplary embodiment, blocks 525 through 550 of FIG. 8 can be performed in a manner described previously with reference to block 525 through 550 of FIG. 5, except that the MNO TSM 215, instead of the TSM A 145A, transfers control of the secure element 126 to the TSM B 145B. In an exemplary embodiment, transfer of control from the MNO TSM 215 to the TSM B 145B is facilitated by the creation of a second temporary key encrypted by the zone master key established between the MNO TSM 215 and TSM B 145B, according to the methods described previously with reference to blocks 525 through 550 of FIG. 5.

From block 550 of FIG. 8, the method 620 proceeds to block 625 of FIG. 6.

Returning to FIG. 6, in block 625, TSM B 145B decrypts the second temporary key using the zone master key established between the MNO TSM 215 and TSM B 145B.

In block 630, TSM B 145B identifies the user device 120 using the device identifier communicated by the MNO TSM 215.

In block 635, TSM B 145B establishes a secure communication channel with the secure element 126 using the second temporary key. In an exemplary embodiment, the secure communication channel is via the network 130.

In block 640, TSM B 145B deletes the second temporary key from the secure element 126. In an exemplary embodiment, MNO TSM 215 can no longer access or control the secure element once the second temporary key is removed from the secure element 126 by TSM B 145B.

In block 645, TSM B 145B injects the TSM B key 149B. In an exemplary embodiment, TSM B 145B inputs the TSM B key 149B and saves it to the secure element 126 to assume control of the secure element 126.

In block 650, TSM B 145B assumes control of the secure element 126. In an exemplary embodiment, the communication channel is terminated at any suitable time after TSM B 145B inputs and saves the TSM B key 149B to the secure element.

From block 650, the method 600 ends.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks and components corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for transferring control of a secure memory, comprising:

creating, by a computer, a master key between a first secure services provider and a second secure services provider, wherein the master key facilitates a transfer of control of a secure memory from the first secure services provider to the second secure services provider;

receiving, by the computer, a request to transfer control of the secure memory from the first secure services provider to the second secure services provider;

initiating, by the computer, a secure communication channel with the secure memory, wherein, the secure communication channel is established using an access key known by the first secure services provider that is resident on the secure memory;

communicating, by the computer, an instruction to delete the access key from the secure memory;

creating, by the computer, a temporary key;

communicating, by the computer, the temporary key to the secure memory;

encrypting, by the computer, the temporary key using the master key established between the first secure services provider and the second secure services provider; and communicating, by the computer, the encrypted temporary key to the second secure services provider for the second secure services provider to access the secure element.

2. The computer-implemented method of claim 1, wherein the computer is a first secure service provider that operates a first trusted service manager ("TSM").

3. The computer-implemented method of claim 1, wherein creating the master key comprises:

generating, by the computer, a first part of the master key;

inputting, by the computer, the first part of the master key into a hardware security module resident on the first secure services provider;

generating, by the computer, a second part of the master key;

inputting, by the computer, the second part of the master key into the hardware security module resident on the first secure services provider;

assembling, by the computer, the first and second master key parts in the hardware security module resident on the first secure services provider; and destroying, by the computer, the master key parts.

4. The computer-implemented method of claim 1, further comprising terminating, by the computer, the secure communication channel with the secure memory.

5. The computer-implemented method of claim 1, further comprising communicating, by the computer, a user device identifier to the second secure services provider, wherein the user device identifier may be used by the second secure services provider to identify the secure memory.

6. The computer-implemented method of claim 1, wherein communicating the encrypted temporary key to the second secure services provider for the second secure services provider to access the secure element comprises communicating the encrypted temporary key to a mediator secure services provider.

7. The computer-implemented method of claim 1, wherein the second secure services provider is the mediator secure services provider.

8. The computer-implemented method of claim 7, further comprising:

decrypting, by the second secure services provider, the temporary key using the master key established between the first secure services provider and the second secure services provider;

initiating, by the second secure services provider, a secure communication channel with the secure memory, wherein the secure communication channel is established using the temporary key decrypted by the second secure services provider;

deleting, by the second secure services provider, the temporary key from the secure memory;

creating, by the mediator secure services provider, a second temporary key;

communicating, by the second secure services provider, the second temporary key to the secure memory;

encrypting, by the mediator secure services provide, the second temporary key using a second master key established between the second secure services provider and a third secure services provider; and communicating, by the mediator secure services provider, the encrypted second temporary key to the third secure services provider for the third secure services provider to access the secure memory.

9. The computer-implemented method of claim 1, wherein the secure memory is a secure element.

10. The computer-implemented method of claim 1, wherein the secure services provider is a trusted service manager.

11. A computer-implemented method for transferring control of a secure memory, comprising:

creating, by a computer, a first master key between a first secure services provider and a mediator secure services provider, wherein the first master key facilitates a transfer of control of a secure memory from the first secure services provider to the mediator secures vies provider;

creating, by a computer, a second master key between the mediator secure services provider and a second secure services provider, wherein the second master key facilitates a transfer of control of the secure memory from the mediator secure services provider to the second secure services provider;

receiving, by the computer, a first temporary key from the first secure services provider to transfer control of the secure element from the first secure services provider to the mediator secure services provider, wherein the first temporary key is encrypted by the first master key established between the first secure services provider and the mediator secure services provider, and wherein the first temporary key has been saved on the secure memory;

decrypting, by the computer, the first temporary key using the first master key established between the first secure services provider and the mediator secure services provider;

initiating, by the computer, a secure communication channel with the secure memory, wherein the secure communication channel is established using the first temporary key decrypted by the mediator secure services provider;

communicating, by the computer, an instruction to delete the first temporary key from the secure memory;

creating, by the computer, a second temporary key;

communicating, by the computer, the second temporary key to the secure memory;

encrypting, by the computer, the second temporary key using the second master key established between the mediator secure services provider and the second secure services provider; and communicating, by the computer, the encrypted second temporary key to the second secure services provider for the second secure services provider to access the secure memory.

12. The computer-implemented method of claim 11, wherein the computer is a mobile operating network that operates the mediator secure services provider.

13. The computer-implemented method of claim 11, wherein creating one of the first and second master keys comprises:

generating, by the computer, a first part of the master key;
inputting, by the computer, the first part of the master key into a hardware security module;

generating, by the computer, a second part of the master key;

inputting, by the computer, the second part of the master key into the hardware security module;

assembling, by the computer, the master key parts in the hardware security module; and destroying, by the computer, the master key parts.

14. The computer-implemented method of claim 11, further comprising terminating, by the computer, the secure communication channel with the secure memory.

15. The computer-implemented method of claim 11, further comprising communicating, by the computer, a user device identifier to the second secure ices provider, wherein the user device identifier may be used by the second secure services provider to identify the secure memory.

16. A computer program product, comprising:

a non-transitory computer-readable medium having computer-readable program code embodied therein for transferring control of a secure memory, the computer-readable program code comprising:

computer-readable program code for receiving a first temporary key from a first secure services provider to transfer control of a secure memory from the first secure services provider to a mediator secure services provider;

computer-readable program code for initiating a secure communication channel with the secure memory, wherein the secure communication channel is established using the first temporary key and wherein the first temporary key is resident on the secure memory;

computer-readable program code for creating a second temporary key, wherein the second temporary key is inputted and saved on the secure memory; and computer-readable program code for communicating the second temporary key to the second secure services provider.

17. The computer program product of claim 16, further comprising:

computer-readable program code for creating a first master key between the first secure services provider to the mediator secure services provider, wherein the master key facilitates a transfer of control of the secure memory from the first secure services provider to the mediator secure services provider; and computer-readable program code for creating a second master key between the mediator secure services provider to the second secure services provider, wherein the master key facilitates a transfer of control of the secure memory from the mediator secure services provider to the second secure services provider.

18. The computer program product of claim 17, wherein the first temporary key is encrypted by the master key established between the first secure services provider and the mediator secure services provider.

19. The computer program product of claim 17, further comprising computer-readable program code for decrypting the first temporary key using the first master key established between the first secure services provider and the mediator secure services provider.

20. The computer program product of claim 17, further comprising computer-readable program code for encrypting the second temporary key using the master key established between the second secure services provider and the mediator secure services provider prior to communicating the second temporary key to the second secure services provider.

21. The computer program product of claim 17, wherein the computer-readable program code for creating one of the first and second master keys comprises:
- computer-readable program code for generating a first part of the master key;
- computer-readable program code for inputting the first part of the master key into a hardware security module;
- computer-readable program code for generating a second part of the master key;
- computer-readable program code for inputting the second part of the master key into the hardware security module;
- computer-readable program code for assembling the master key parts in the hardware security module; and
- computer-readable program code for destroying the master key parts.

22. The computer program product of claim 16, further comprising computer-readable program code for deleting the first temporary key from the secure memory.

23. The computer program product of claim 22, wherein the computer-readable program code for deleting the access key from the secure memory comprises computer-readable program code for communicating an instruction to the secure memory to delete the access key from the secure memory.

24. The computer program product of claim 16, further comprising computer-readable program code for terminating the secure communication channel with the secure memory.

25. The computer program product of claim 16, further comprising computer-readable program code for communicating a user device identifier to the second secure services provider, wherein the user device identifier may be used by the second secure services provider to identify the secure memory.

26. The computer program product of claim 16, wherein the secure memory is a secure element and the secure service provider is a trusted service manager.

27. A system for transferring control of a secure memory, the system comprising:
- a storage device; and
- a processor configured to execute computer-executable instructions store the storage device to transfer control of a secure memory, the computer-executable instructions comprising:
    - instructions for receiving a first temporary key from a first secure services provider to transfer control of a secure memory from the first secure services provider to a mediator secure services provider;
    - instructions for initiating a secure communication channel with the secure memory, wherein the secure communication channel is established using the first temporary key;
    - instructions for communicating an instruction to delete the first temporary key from the secure memory;
    - instructions for creating a second temporary key;
    - instructions for communicating the second temporary key to the secure memory; and
    - instructions for communicating the second temporary key to the second secure services provider for the second secure services provider to access the secure memory.

28. The system of claim 27, the computer-exec instructions further comprising instructions for terminating the secure communication channel with the secure memory.

29. The system of claim 27, the computer-executable instructions further comprising instructions for communicating a user device identifier to the second secure services provider, wherein the user device identifier may be used by the second secure services provider to identify the secure memory.

30. The system of claim 27, wherein the secure memory is a secure element and the secure services provider is a trusted service manager.

* * * * *

UNITED STATES PATENT AND TRADEMARK OFFICE
CERTIFICATE OF CORRECTION

PATENT NO.        : 8,625,800 B2                                             Page 1 of 1
APPLICATION NO.   : 13/776660
DATED             : January 7, 2014
INVENTOR(S)       : Sarel Kobus Jooste et al.

It is certified that error appears in the above-identified patent and that said Letters Patent is hereby corrected as shown below:

In the Claims:

Column 13, Claim 11, line 23 should read "--secure services provider--"

Column 14, Claim 15, line 14 should read "--secure services provider--"

Column 15, Claim 27, line 3 should read "--instructions stored in the storage device to transfer control--"

Column 16, Claim 28, line 25 should read "--the computer-executable instructions--"

Signed and Sealed this
Third Day of June, 2014

Michelle K. Lee
*Deputy Director of the United States Patent and Trademark Office*